United States Patent Office 3,410,261
Patented Nov. 12, 1968

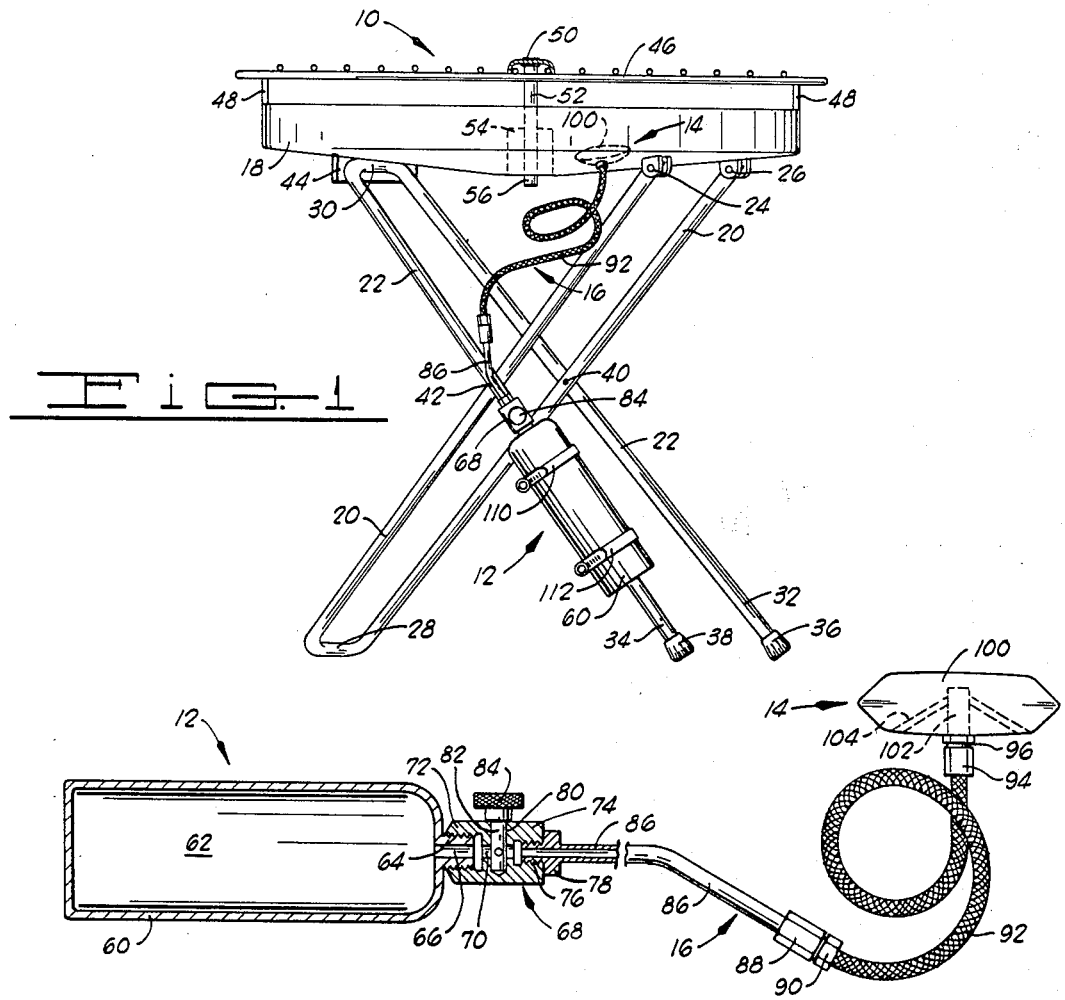

3,410,261
COMBINATION BARBECUE GRILL AND IGNITION DEVICE
Milton V. Cooper, 4 Oakwood Drive, Oklahoma City, Okla. 73121, and Walter N. Slater, Del City, Okla.; said Slater assignor to said Cooper
Filed Nov. 21, 1966, Ser. No. 595,748
1 Claim. (Cl. 126—25)

ABSTRACT OF THE DISCLOSURE

A charcoal grilling apparatus consisting of a container for holding heated fuel with a grill supported thereover and support means extending below the container, the apparatus including an ignition device in the form of a cannister of flammable gas secured in a safe position and connected via flexible tubing to a burner head secured within said container.

---

This invention relates generally to improvements in barbecue grill apparatus and, more particularly, but not by way of limitation, it relates to an improved grill apparatus which includes a fuel ignition device as a permanently affixed component in combination therewith.

The present invention contemplates improvements in charcoal grilling apparatus, especially such grilling apparatus of the portable variety, e.g., that type which is foldable into a more storageable or more easily handled configuration. The invention consists of an ignition device including its own auxiliary fuel supply which can be permanently affixed to the charcoal grilling apparatus, the affixure being in such manner that the storageability of the grilling apparatus is not hampered, and the physical interconnection between the ignition device and the brazier or coals container being of heat resistant, isolating type.

Therefore, it is an object of the present invention to provide a portable charcoal grill which includes auxiliary igniting components as integral parts thereof.

It is a further object of the present invention to provide such an auto-ignition device which is relatively simple and easily attached to various types of charcoal grilling apparatus both of the portable and the more substantial design types.

Finally, it is an object of the present invention to provide an auxiliary ignition device which can be attached to charcoal grilling apparatus without danger of damage from heat conduction or radiation, the bulk ignition fuel supply being safely isolated from the intense heat present in the brazier portion of the apparatus.

Other objects and advantages of the invention will be evident from the following detailed description when read in conjunction with the accompanying drawings which illustrate the invention.

In the drawings:

FIG. 1 shows a side view of the overall device, an exemplary form of grilling apparatus in combination with the ignition device;

FIG. 2 is an enlarged side view of the ignition device in partial section; and

FIG. 3 is a perspective view of the under side of one form of burner head employed with the ignition device of FIGS. 1 and 2.

Referring to the drawings in detail, and particularly to FIG. 1, a grilling apparatus 10 is constructed to have an ignition fuel supply 12 and an associated burner head 14 affixed in combination therewith. The grilling apparatus 10 may be any of various commercially available grilling apparatuses and it is preferably one of the foldable more easily portable types; however, such an auxiliary ignition device (fuel supply 12 connected to a burner head 14) can be employed with many different types of apparatus as long as adequate precaution is taken in providing sufficient flexibility and heat resistance qualities to the interconnecting delivery tubing 16 therebetween.

The exemplary form of grilling apparatus 10 consists of a brazier portion 18 as supported by a pair of oppositely oriented U-shaped support members 20 and 22. U-shaped member 20 has each end pivotally secured in clevises 24 and 26 which are suitably fastened as by welding or otherwise to the under side of brazier 18. The closed end 28 of U-shaped member 20 then serves as a footing portion. The second U-shaped member 22 is oppositely oriented such that its closed end 30 can be braced beneath the under side of brazier 18 while the two ends 32 and 34 are terminated in rubber snubbers or other suitable footing members 36 and 38 for engagement with the ground or supporting surface. Each leg of U-shaped member 22 is pivotally fastened to respective legs of U-shaped member 20, as by the pin fasteners 40 and 42. A bracing member 44, a suitable angle piece or the like, is fastened beneath the brazier 18 to act as a stop preventing horizontal, outward movement of end portion 30 of U-shaped member 22 to thereby secure the U-shaped members 20 and 22 such that they will support the brazier 18 in its operative position. The clevises 24 and 26 and bracing member 44 are preferably placed in symmetrical quadratic relationship about the under side of brazier 18 to give proper balance to the grilling apparatus 10 when operative.

The grilling apparatus 10 is illustrated as including the conventional wire grill member 46 across the top of brazier 18, as may be secured by various devices. One well known way in which wire screen 46 can be supported is by suspension from support members 48 disposed on opposite sides of the upper rim of brazier 18. Another form of suspension would utilize a center support such as shown in FIG. 1. That is, wire grill 46 is affixed by a suitable clamp member 50 to a center supporting rod 52. The supporting rod 52 is then maintained slidably positioned in a suitable bushing member 54 which is affixed to the bottom of the brazier 18. The support member 52 is selected to be of a size such that a lower portion 56 extends beneath the brazier 18 and this extension can then be raised or lowered by suitable means (not shown) to thereby position the height of wire grill 46. One conventional form of device for raising and lowering the support 52 is by means of a ratchet-locked lever arrangement which can be manually operated from the outer, cool area adjacent brazier 18 to adjust the height of wire grill 46.

Referring particularly to FIG. 2, the fuel source 12 consists of a bottle or canister 60 containing a compressed gas within interior 62. The gas is preferably propane or other of the well known flammable gases which are suitable for safe and economical disposition under pressure. Gas bottle 60 may then be adapted to have a threaded outlet 64 defining a gas passage 66 for insertion in a control valve cap 68. Control valve cap 68 is formed with a central bore 70 therethrough. The central bore 70 is enlarged and threaded within a first end 72 to mate in sealing relationship with the threaded portions of the threaded outlet 64 of gas bottle 60. The other end or outlet of bore 70 at the opposite end 74 is threaded as by thread 76 to receive a threaded connector 78 therein. A bore 80 is formed in valve cap 68 at right angles to the central bore 70 to receive a valve stem 82 which can be manipulated by a suitable knurled knob or other such handle 84 to open and close the gas passage through the central bore 70. It should be understood that various types of conventional valves can be employed here, the selection depending upon the type of gas regulation desired.

The threaded outlet connector 78 is brazed or otherwise joined in conventional manner onto a delivery tubing member 86 which extends outward and is terminated by a suitable female fitting 88. The fitting 88 makes connection with a connector 90 which is bonded by conventional means to a section of heat resistant and non-heat conductive hose 92 which is again terminated in a female connector 94, connector 94 also being affixed in sealing relationship thereto. The hose 92 may be formed from woven asbestos and, if desired, it may include additional reinforcing and plasticizing materials to insure its heat resistance and gas sealing qualities. It is contemplated too that Teflon or other materials from various classes of heat resistant plastics may be employed.

The female connector fitting 94 then connects to a suitable male adaptive connector such as threaded connector element 96 which is affixed as by welding, threads, etc., in gas sealing relationship into the burner head 14. Burner head 14 is made up of an element 100 which may be formed or cast from suitable metallic material and preferably in the shape of a charcoal briquet. The under side of burner head 100 (FIG. 3) may be formed with a central bore 102 wherein the adaptive connector 96 is received as by threads, welding, or whatever. Thereafter, a plurality of radially disposed bores 104 are formed from the outer under side of burner head 100 to the central bore 102. Thus, the burner head 14 serves to provide a plurality of ignited fuel jets which will be directed outwardly and at acute angles to the bottom of brazier 18.

Referring again to FIG. 1, it can be seen that the gas bottle 60 can be readily secured to one leg 34 of U-shaped support member 22 by means of a pair of straps or clamps 110 and 112. The delivery tube 86 and flexible tubing 92 are then selected to be of such a length that the gas delivery is made to the burner head 14 secured in the brazier 18. The threaded connector 96 and female connector 94 (FIG. 2) may be employed to perform the additional function of securing the burner head 14 in the brazier 18. That is, the entry bore into brazier 18 can be sized such that the securing of female connector 94 will securely clamp the burner head 14 in proper position within brazier 18. There are various other forms of such mounting and/or connecting device which may be employed to equally good advantage.

*Operation*

Various operations of grilling apparatus 10 can be completely carried out from actual grill use to folded storage with the ignition fuel supply 12 and its associated burner head 14 remaining intact. That is, no matter what the design of the grilling apparatus 10, and there are many forms which are applicable in addition to that shown in FIG. 1, the auxiliary ignition system is of sufficiently small size, flexibility, and adaptability to existing structures that it can be affixed for use with varying configurations.

Thus, the grill structure 10 can be set up for use when the foldable or storable parts of structure are properly assembled or manipulated into the integral unit. Knob 84 of the valve cap 68 can then be adjusted to allow fuel gas through the delivery tubing 16 to the burner head 14 whereupon it can be ignited around the under side of burner head 14. Charcoal, mesquite wood or other fuel substance can be suitably placed within the brazier 18 such that it is ignited by the burner head 14. The operator can then shift the unlit and lit fuel material to gain an evenly ignited bed of embers. Also, it is contemplated that a distribution ring or other ignition localizing device can be placed around the inner bottom of brazier 18 to minimize the shifting of ignited coals by the operator. After sufficient pre-ignition of coals has been effected, the ignition fuel supply 12 can be cut off by closing the valve cap 84 through the manipulation of knurled knob 68.

After use of the grilling apparatus 10, the spent coals or ashes can be removed or dumped from the brazier 18 and, after a slight cooling time, the grilling apparatus 10 can be folded to its portable position for storage or whatever. Thus, lifting of the brazier 18 frees the end portion 30 of U-shaped member 22 such that U-shaped member 22 and U-shaped member 20 can be folded together in scissors fashion and, at the same time, the brazier 18 turning about clevis attachments 24 and 26 can be dropped to rest adjacent the folded support assembly. The above folding operation may not be performed except after long intervals, as for seasonally required storage, but it should be apparent that it can be carried out without attention to either the fuel supply 12 or burner head 14. The ignition attachment is suitably flexible and small in overall size such that it should not interfere with the folding operations.

The foregoing discloses a combination of apparatus which enables more versatile usage of grilling apparatus, a combination of apparatus which is relatively permanent in character and requires only periodic replacement of the fuel gas supply as by replacement or recharging of the fuel gas bottles themselves. The apparatus has the further advantage of providing an ignition system which is small and sturdy of construction such that danger of breakage or malfunction is lessened; the apparatus having additional beneficial attributes in that certain aesthetic as well as functional effects are attained by the certain shaping and formation of the burner head.

Changes may be made in the combination and arrangement of elements as heretofore set forth in this specification and shown in the drawings; it being understood that changes may be made in the elements disclosed without departing from the spirit and scope of the invention as defined in the following claim.

What is claimed is:

1. Grilling apparatus of the type comprising an upper container for holding ignited fuel, a wire grill secured across said fuel container, support means affixed below said fuel container to maintain it in operative position, and an ignition device for permanent fixture to said support means, said ignition device comprising:

a canister containing flammable gas under pressure which is affixed to said support means;

valve head means including a stop valve secured to one end of said cannister means and controlling the passage of gas from said cannister through said valve head means;

a burner head means permanently secured within said upper fuel container to expose a connector portion therebelow, said burner head means being of metallic formation in the shape of a charcoal briquette which has a plurality of fuel outlet holes around its underside and directed outward along the surface of said container; and a selected length of flexible tubing formed of heat resistant material which exhibits low heat conductivity, said tubing being connected in sealing relationship to conduct the ignition fuel from said valve head means to said burner head means.

References Cited

UNITED STATES PATENTS

| | | | |
|---|---|---|---|
| 510,447 | 12/1893 | Smith | 158—10 |
| 934,512 | 9/1909 | Esposito | 158—10 |
| 2,991,808 | 7/1961 | Siegmann et al. | 138—141 |
| 2,932,065 | 4/1960 | Jenkins. | |
| 2,994,315 | 8/1961 | Bussing | 126—9 |
| 3,033,275 | 5/1962 | Nichols. | |
| 3,123,102 | 3/1964 | Frieder et al. | 138—125 |
| 3,297,016 | 1/1967 | Rhodes. | |
| 3,339,505 | 9/1967 | Bean. | |

FREDERICK KETTERER, *Primary Examiner.*